United States Patent
DeVries, Jr. et al.

(10) Patent No.: US 11,855,540 B2
(45) Date of Patent: Dec. 26, 2023

(54) LEADFRAME FOR CONDUCTIVE WINDING

(71) Applicant: TEXAS INSTRUMENTS INCORPORATED, Dallas, TX (US)

(72) Inventors: Charles Allen DeVries, Jr., Winfield, IL (US); Kyle Brent Norell, Cary, IL (US); Kristen Nguyen Parrish, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1160 days.

(21) Appl. No.: 16/364,492

(22) Filed: Mar. 26, 2019

(65) Prior Publication Data
US 2020/0313555 A1 Oct. 1, 2020

(51) Int. Cl.
| | |
|---|---|
| H01F 27/29 | (2006.01) |
| H02M 3/158 | (2006.01) |
| H01F 41/04 | (2006.01) |
| H01F 27/28 | (2006.01) |
| H01F 38/02 | (2006.01) |

(52) U.S. Cl.
CPC ...... *H02M 3/1582* (2013.01); *H01F 27/2804* (2013.01); *H01F 41/04* (2013.01); *H01F 2038/026* (2013.01)

(58) Field of Classification Search
CPC .... H02M 3/1582; H02M 3/003; H02M 3/158; H01F 27/2804; H01F 41/04; H01F 2038/026; H01F 27/29; H01F 2017/048; H01F 27/2852
See application file for complete search history.

(56) References Cited

U.S. PATENT DOCUMENTS

| | | | |
|---|---|---|---|
| 8,471,665 B2 * | 6/2013 | Urano | H01F 27/292 336/212 |
| 9,378,882 B2 | 6/2016 | Kummerl et al. | |
| 2009/0315660 A1 * | 12/2009 | Oki | H01F 27/292 29/605 |
| 2010/0001826 A1 * | 1/2010 | Gardner | H01F 17/0033 336/232 |
| 2011/0006867 A1 * | 1/2011 | Oki | H01F 27/292 336/192 |
| 2011/0242775 A1 * | 10/2011 | Schaible | H01F 17/04 361/752 |
| 2013/0027161 A1 * | 1/2013 | Urano | H01F 17/04 336/83 |
| 2014/0002227 A1 * | 1/2014 | Hsieh | H01F 5/00 336/200 |

(Continued)

*Primary Examiner* — Mang Tin Bik Lian
(74) *Attorney, Agent, or Firm* — Dawn Jos; Frank D. Cimino

(57) ABSTRACT

A device includes a circuit assembly and a first conductive winding support having a first end attached to the circuit assembly and having a first winding support surface a first distance from the circuit assembly. The device also includes a second conductive winding support having a second end attached to the circuit assembly and having a second winding support surface a second distance from the circuit assembly, the second distance being different than the first distance. A conductive winding has first and second winding ends. The first winding end is attached to the first winding support surface, and the second winding end is attached to the second winding support surface.

18 Claims, 12 Drawing Sheets

(56) References Cited

U.S. PATENT DOCUMENTS

| | | | |
|---|---|---|---|
| 2015/0348707 A1* | 12/2015 | Hsieh | H01F 27/00 29/17.2 |
| 2016/0247626 A1* | 8/2016 | Kawarai | H01F 27/2823 |
| 2017/0229232 A1* | 8/2017 | Takagi | H01F 27/306 |
| 2017/0309392 A1* | 10/2017 | Kobayashi | H01F 27/2823 |
| 2018/0019056 A1* | 1/2018 | Tanaka | H01F 27/29 |
| 2019/0198226 A1* | 6/2019 | Kawamura | H01F 27/2804 |
| 2020/0194161 A1* | 6/2020 | Hu | H01F 27/40 |
| 2020/0234860 A1* | 7/2020 | Kusuda | H01F 27/29 |

\* cited by examiner

LEADFRAME FOR CONDUCTIVE WINDING

BACKGROUND

Some types of electronic circuits include inductors. One such circuit is a switching power converter (e.g., a buck converter). In one example, a switching power converter includes power transistors, a circuit to drive the on and off states of the power converters, drivers to drive the control inputs (e.g., gates) of the power transistors, an output capacitor, and an inductor. Typically, the inductor is quite large relative to the rest of the power converter. The inductor and the rest of the power converter components (transistors, drivers, etc.) are attached to a metal leadframe. The leadframe typically is a flat metal structure.

SUMMARY

In one example, a device includes a circuit assembly and a first conductive winding support having a first end attached to the circuit assembly and having a first winding support surface a first distance from the circuit assembly. The device also includes a second conductive winding support having a second end attached to the circuit assembly and having a second winding support surface a second distance from the circuit assembly, the second distance being different than the first distance. A conductive winding has first and second winding ends. The first winding end is attached to the first winding support surface, and the second winding end is attached to the second winding support surface.

In another example, a device includes a switching power supply assembly and a first conductive winding support having a first end attached to the switching power supply assembly and having a first winding support surface a first distance from the switching power supply assembly. A second conductive winding support is provided that has a second end attached to the switching power supply assembly and that has a second winding support surface a second distance from the switching power supply assembly. The second distance is different than the first distance. The device further includes a conductive winding having first and second winding ends. The first winding end is attached to the first winding support surface, and the second winding end is attached to the second winding support surface.

In yet another example, a method includes fabricating a leadframe into a flat pattern (e.g., a frame having a general uniform thickness), and then bending portions of the leadframe to form a plurality of conductive winding receptacles. Each of the plurality of conductive winding receptacles includes a first support surface, a second support surface, and a first shelf. The method further includes attaching a separate conductive winding to each conductive winding receptacle to form a subassembly coil strip through attachment of a first terminal of the conductive winding to the corresponding first support surface and attachment of a second terminal of the conductive winding to the second support surface. A surface portion of the conductive winding touches the first shelf. The method also includes attaching the subassembly strip to a module substrate. The module substrate includes a plurality of circuit assemblies. The method further includes applying mold compound to the subassembly coil strip and module substrate assembly, and singulating the subassembly strip and module substrate.

BRIEF DESCRIPTION OF THE DRAWINGS

For a detailed description of various examples, reference will now be made to the accompanying drawings in which.

DETAILED DESCRIPTION

As noted above, inductors tend to be one of the largest components, if not the largest component, of a power converter. However, many applications benefit from smaller package sizes. The desire for smaller packages creates a tension between package size and power converter performance. For a given package size, the inductor may need to be undersized which results in sub-optimal performance.

The disclosed examples are directed to a device (e.g., a power converter) that includes a leadframe to which an inductor and the remaining components of the power converter (e.g., any one or more transistors, drivers, capacitors, controllers, etc.) are attached. The disclosed leadframe has horizontal and vertical features (i.e., is three-dimensional instead of planar). The vertical features support and attach to the inductor. Because the inductor attaches to vertical features of the leadframe, the footprint needed for the power converter is smaller compared to the use of a purely planar leadframe.

Figure 1:
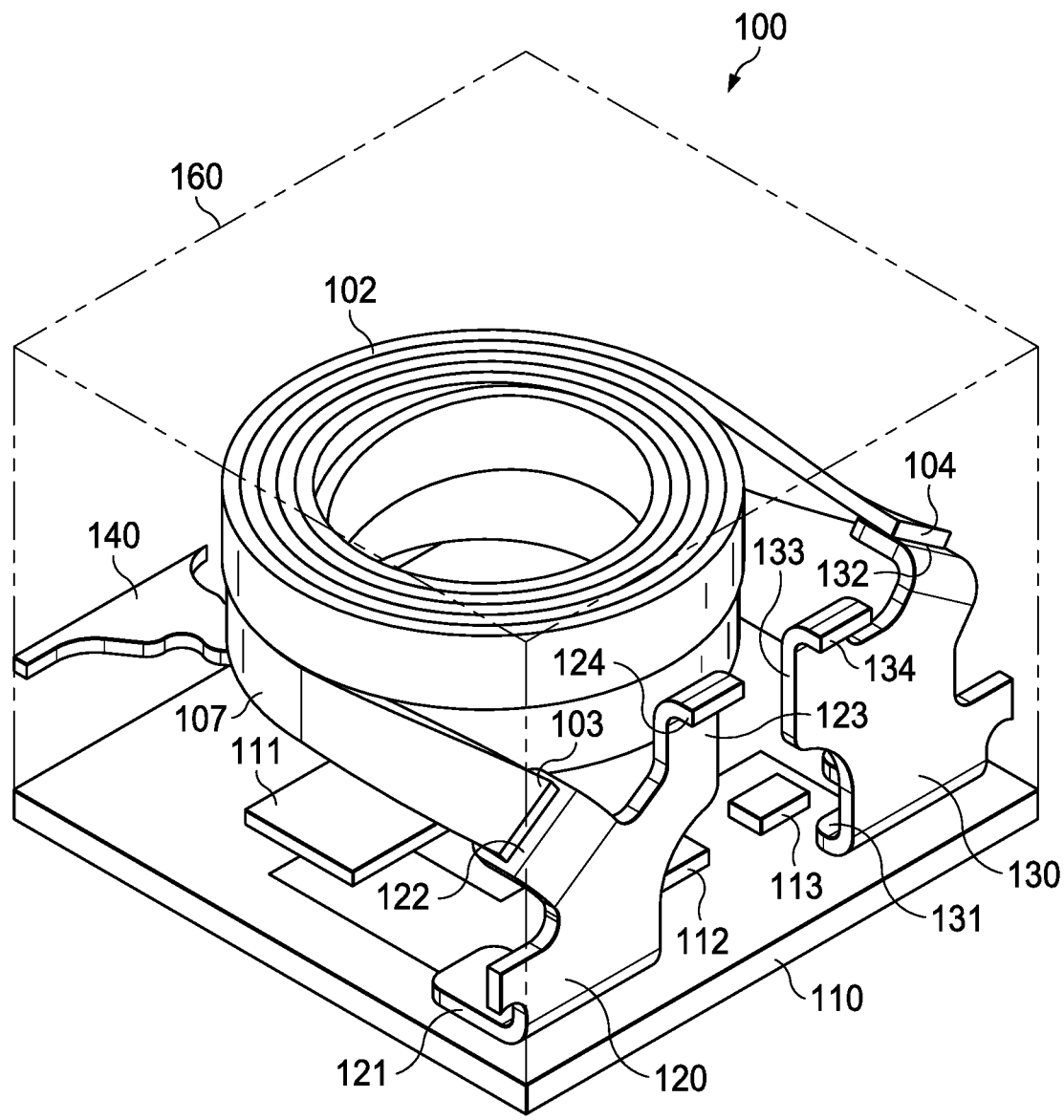
FIG. 1 illustrates an example of a device 100.

FIG. 1 shows an illustrative example of a device 100 comprising a circuit assembly 110, a conductive winding 102, conductive winding supports 120 and 130, and a shelf 140. The conductive winding 102 comprises an inductor, and the circuit assembly 110 includes various electrical components 111, 112, and 113. In one example, the device 100 comprises a voltage regulator (e.g., a buck converter, boost converter, etc.) which generates a regulated output voltage that is larger or smaller than an unregulated input voltage. Such electrical components 111-113 may comprise transistors (e.g., metal oxide semiconductor field effect transistors), capacitors, drivers, a controller, etc., and the device 100 in this example comprises a switching power supply assembly. For example, component 111 may comprise a controller coupled to the conductive winding 102 via traces on the circuit assembly. Any or all of the components 111-113 may be provided in the form of an integrated circuit formed on a semiconductor die to which the conductive winding is coupled.

As a switching power supply assembly, device 100 may include a high side transistor coupled to a low side transistor at a switching node. The conductive winding 102 connects between the switching node and a voltage output node. The high side transistor connects to a supply voltage node and the low side transistor connects to the ground node. Thus, the high and low side transistors connect in series between the supply voltage and ground nodes. Through gate drivers connected to the gates of the high and low side transistors, a controller generates a pulse width modulation signal that causes the high and low side transistors to be reciprocally turned on (i.e., when the high side transistor is on, the low side transistor is off, and vice versa). A "dead time" may be implemented as one transistor is turned off before the other transistor is turned on. An output capacitor is connected to the voltage output node as well. Depending on the input voltage to the high side transistor and the duty cycle of the pulse width modulation signal, the output voltage can be controlled to a desired level.

The conductive winding may be coated with an insulator (e.g., plastic such as polyimide). The conductive winding 102 may comprise a flat wire wound coil, a stable winding, a round wire wound coil, outer-outer coil, or other type of winding. One side 107 of the conductive winding 102 rests on a shelf 140. The conductive winding 102 includes winding ends 103 and 104. Winding end 103 is attached to a support surface 122 of conductive winding support 120, and winding end 104 is attached to a support surface 132 of conductive winding support 130. The winding ends 103 and 104 may be laser-welded to their respective support surfaces 122 and 132, or attached through a different mechanism. The conductive winding 102 is positioned over the circuit assembly 110 in this example.

The conductive winding support 120 comprises a generally vertical post 123 that is attached to the circuit assembly 110 via end portion 121. The end portion 121 in this example is a horizontal member that is orthogonal to the vertical post 123. "Horizontal" in this disclosure refers to the plane of the circuit assembly 110. "Vertical" refers to the direction orthogonal to the plane of the circuit assembly 110. Similarly, the conductive winding support 130 also comprises a vertical post 133 that is attached to the circuit assembly 110 via end portion 131. The end portion 131 is a horizontal member that is orthogonal to the vertical post 133. The upper end of the conductive winding support 120 includes a horizontal lip 124. The upper end of the vertical post 123 is curved into the horizontal lip 124 as shown. The upper end of the conductive winding support 130 also includes a horizontal lip 134.

The components shown in FIG. 1 are encapsulated in a mold compound 160. The mold compound 160 surrounds the components and into the space between the bottom of the conductive winding 102 and the circuit assembly 110. In some implementations, the mold compound comprises a magnetic mold compound.

Figure 2:
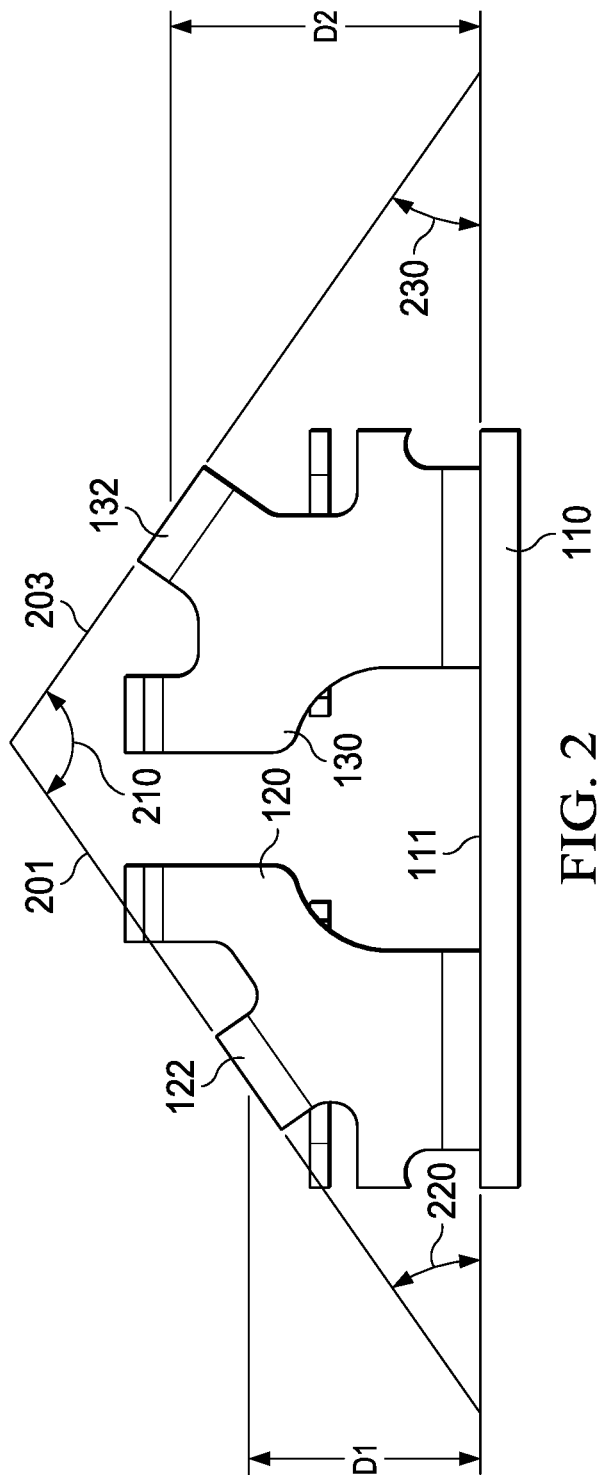
FIG. 2 shows a front view of a portion of the device 100.

FIG. 2 shows a front view of the device 100 without the conductive winding 102. As can be seen in FIG. 2 (and in FIG. 1 and other figures), the support surface 122 is angled with respect to the circuit assembly 110, and with respect to the support surface 132. Support surface 122 defines a plane (as indicated by line 201), and support surface 132 also defines a plane indicated by line 203. The angle between the two planes is indicated by angle 210. Angle 210 is greater than or equal to 0 degrees and less than 180 degrees. At 180 degrees, the two planes defined by support surfaces 122 and 132 would be parallel to the plane defined by the circuit assembly 110. At 0 degrees, the two planes would be parallel to each other, but 90 degrees with respect to the circuit assembly 110. The plane defined by support surface 122 forms an angle 220 with respect to the plane defined by the circuit assembly 110. Angle 220 is greater than 0 degrees. For example, angle 220 may be less than 90 degrees, and may be in the range of 20 degrees to 60 degrees. Similarly, the plane defined by support surface 132 forms an angle 230 with respect to the plane defined by the circuit assembly 110.

Angle 230 is greater than 0 degrees. For example, angle 230 may be less than 90 degrees, and may be in the range of 20 degrees to 60 degrees.

The distance D1 represents the distance from the support surface 122 to the circuit assembly 110. Distance D2 represents the distance from the support surface 132 to the circuit assembly 110. As support surfaces 122 and 132 are angled with respect to the circuit assembly 110, the distances D1 and D2 may define the distance from the mid-points of the support surfaces 122, 132 to the upper surface 111 of the circuit assembly 110. D1 and D2 can be measured from other points on the support surfaces 122 and 132 as long as the same point is used for both measurements (the mid-point, a lower edge, an upper edge, etc.). In this example, D1 is different than D2.

As can be seen in FIG. 1, the ends 103 and 104 of the conductive winding 102 are at different distances from the circuit assembly 110, and such distance difference is accommodated by a corresponding location of the support surfaces 122 and 132 to which the ends 103, 104 are attached. Further, by angling the support surfaces 122 and 132 so that the support surfaces are not parallel to the plane of the circuit assembly, the resulting device has a smaller footprint than would otherwise be the case if the support surfaces 122, 132 and the ends 103, 104 of the conductive winding were horizontal to the plane of the circuit assembly.

Figure 3:
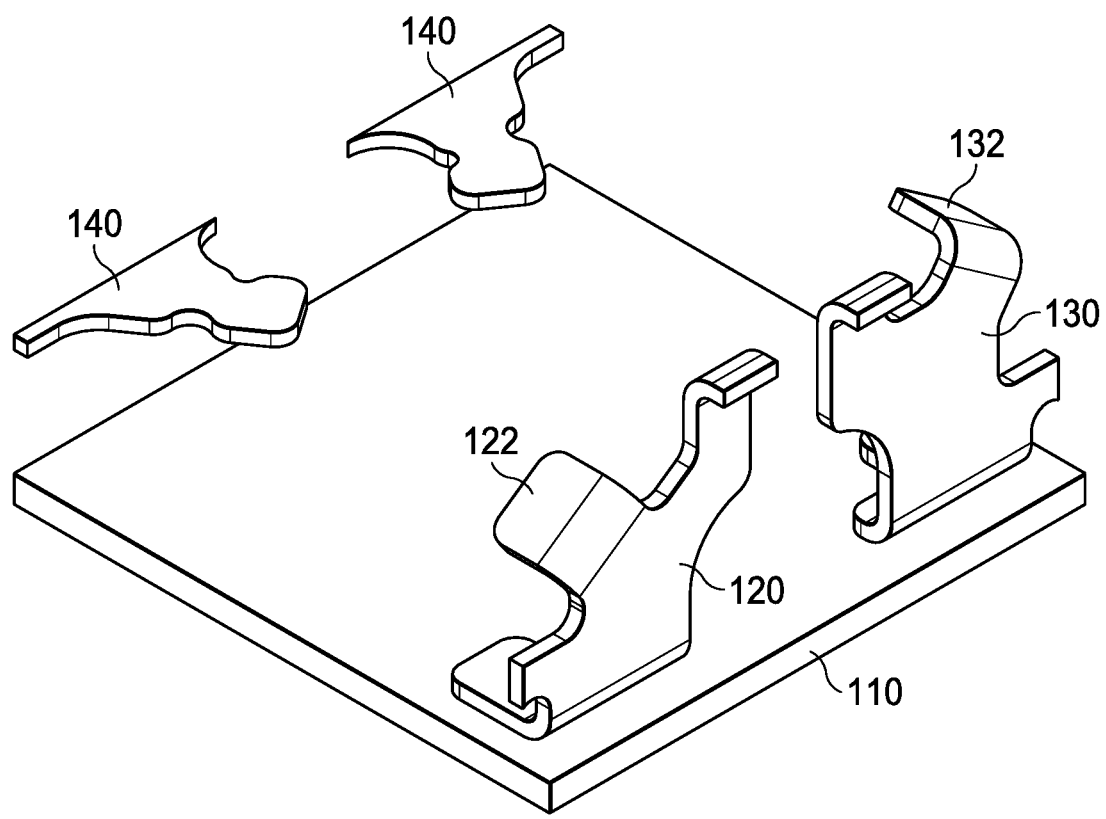
FIG. 3 shows another example view of the device 100 illustrating the components of a leadframe that remain following singulation.

FIG. 3 shows a view of the circuit assembly 110, conductive winding supports 120 and 130, and shelves 140, but without the conductive winding 102. Two shelves 140 are present in this example (the conductive winding 102 of FIG. 1 hid one of the shelves 140 from view).

Figure 4:
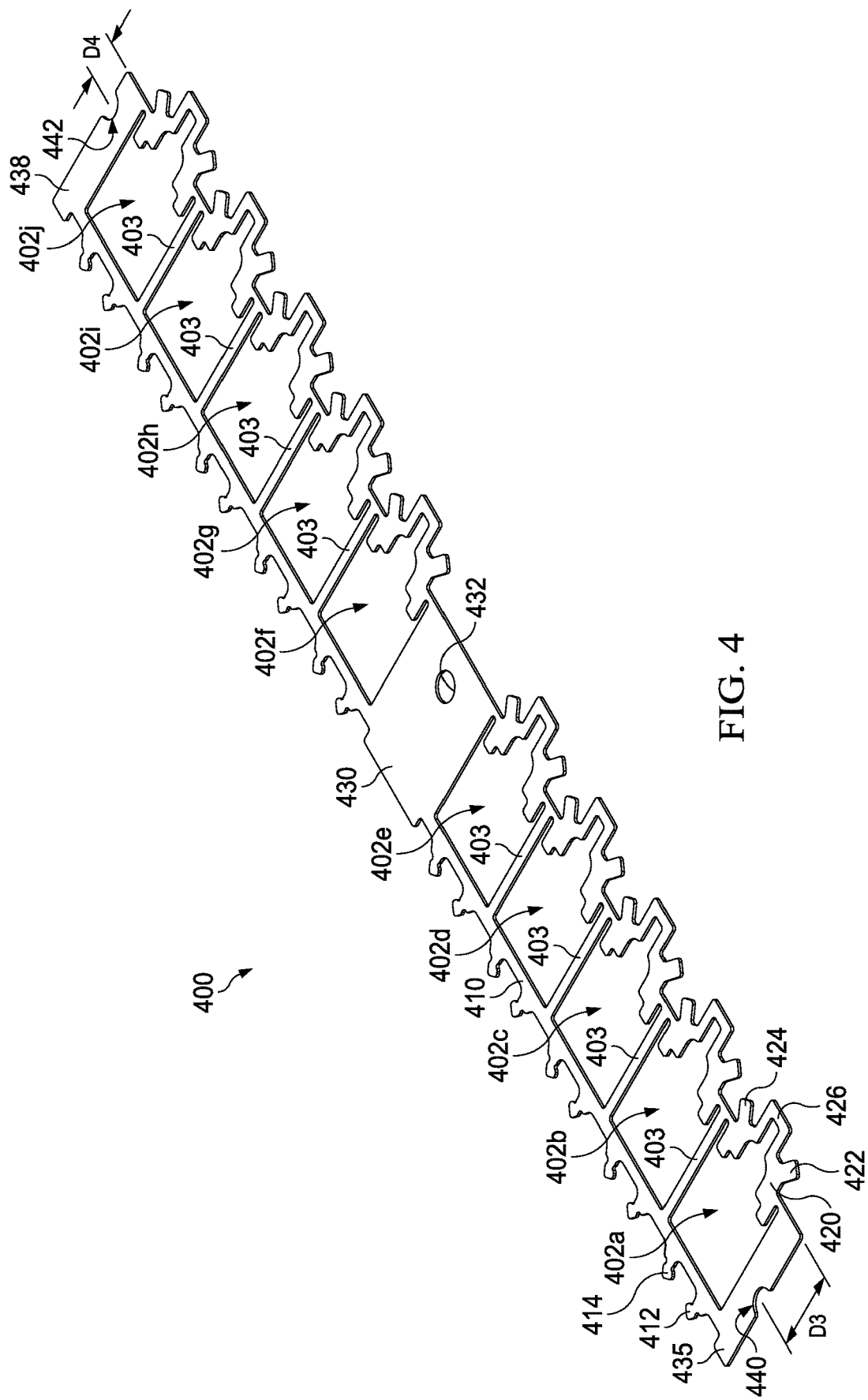
FIG. 4 illustrates the leadframe in a planar configuration before bending the leadframe into a three-dimensional (3D) configuration.

A process to fabricate the device 100 will now be described. FIG. 4 shows a leadframe 400. At this point during the fabrication process, the leadframe 400 is planar, and will subsequently be bent into a 3D form and singulated to produce the shelves 140 and conductive winding supports 120 and 130. The leadframe 400 includes multiple conducting winding receiving receptacles including receiving receptacles 402a, 402b, 402c, 402d, 402e, 402f, 402g, 402h, 402i, and 402j (collectively receiving receptacles 402). The leadframe 400 includes ten receiving receptacles 402 in this example, but the leadframe 400 can include other than ten receiving portions in other examples. The five receiving receptacles 402a-402e are separated from the five receiving receptacles 402f-402j by a central separation member 430 which can be used to handle and move the leadframe 400 during fabrication of device 100.

Leadframe 400 includes a front side 420, a rear side 410, a left side member 435, and a right side member 438. Left side 435 is generally rectangular with an alignment notch 440. Right side 438 also is generally rectangular with an alignment notch 442. The central separation member 430 includes an alignment hole 432. The alignment notches 440 and 442 and the alignment hole 432 help to align the leadframe 400 as it is attached to a module substrate strip (described below). The alignment notch 440 is a distance D3 from the front side 420 of the leadframe 400, and the alignment notch 442 is a distance D4 from the front side of the leadframe. In this example, D3 is different than D4, thereby ensuring that the leadframe is not attached to the module substrate strip in a backwards orientation.

Each pair of adjacent receiving receptacles 402 is separated by a dividing member 403. For each receiving receptacle 402, the rear side 410 includes a pair of rear protruding portions 412 and 414. When the leadframe 400 is bent into its final shape, the protruding portions 412 and 414 will become shelves 140. For each receiving receptacle 402, the front side 420 also includes a pair of protruding portions 422 and 424 on either side of a connecting portion 425. The connecting portion 426 in this example is generally U-shaped (with square corners) and protrudes away from the receiving receptacle 402 more than the protruding portions 422 and 424. When the leadframe 400 is bent into its final shape, the protruding portions 422, 424 will become the horizontal lips 124 and 134. The connecting portion 426 will be removed to thereby mechanically separate and electrically isolate the horizontal lips 124, 134.

Figure 5:
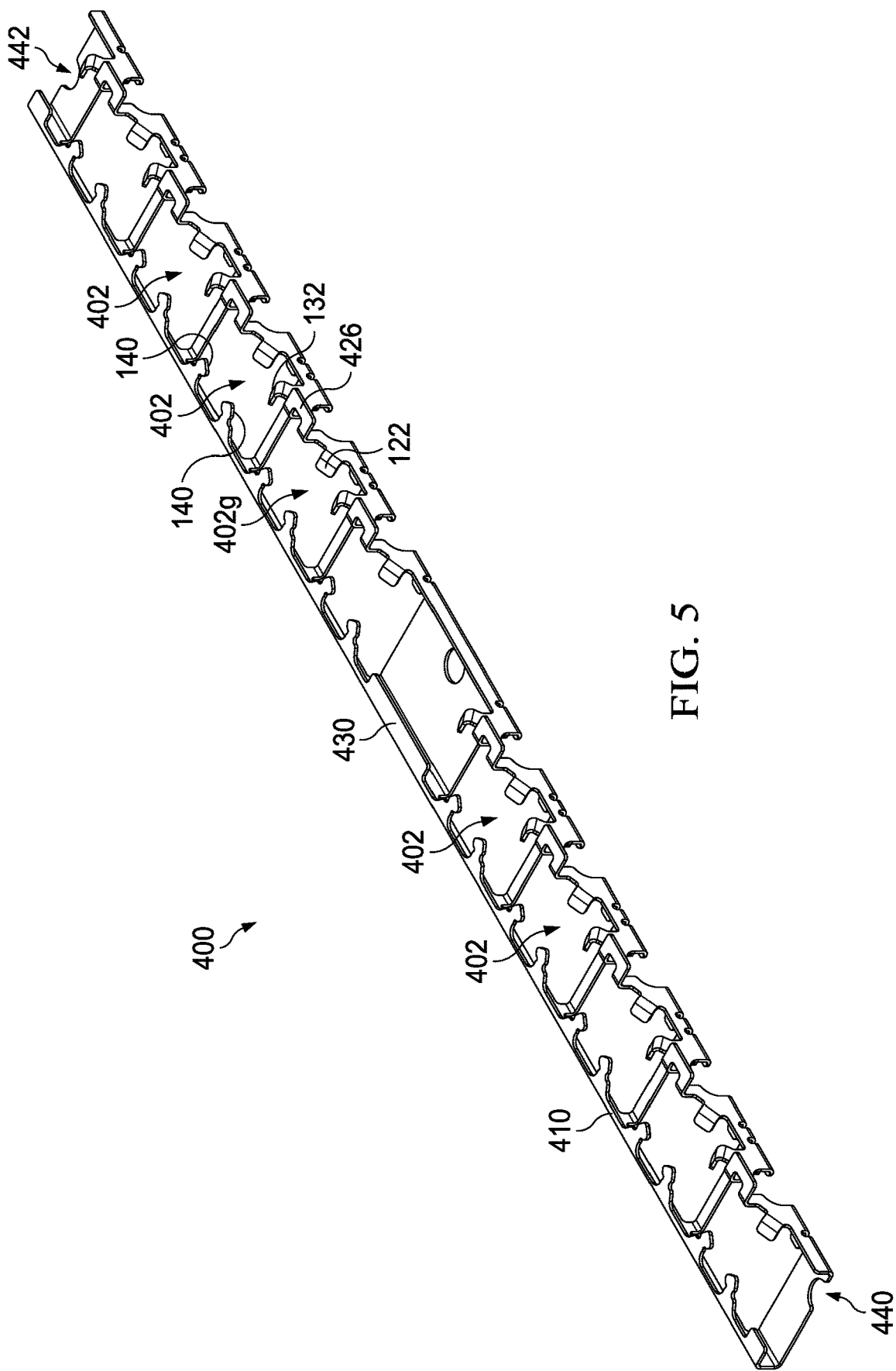
FIGS. 5 and 6 shows the leadframe bent into a 3D configuration.
Figure 6:
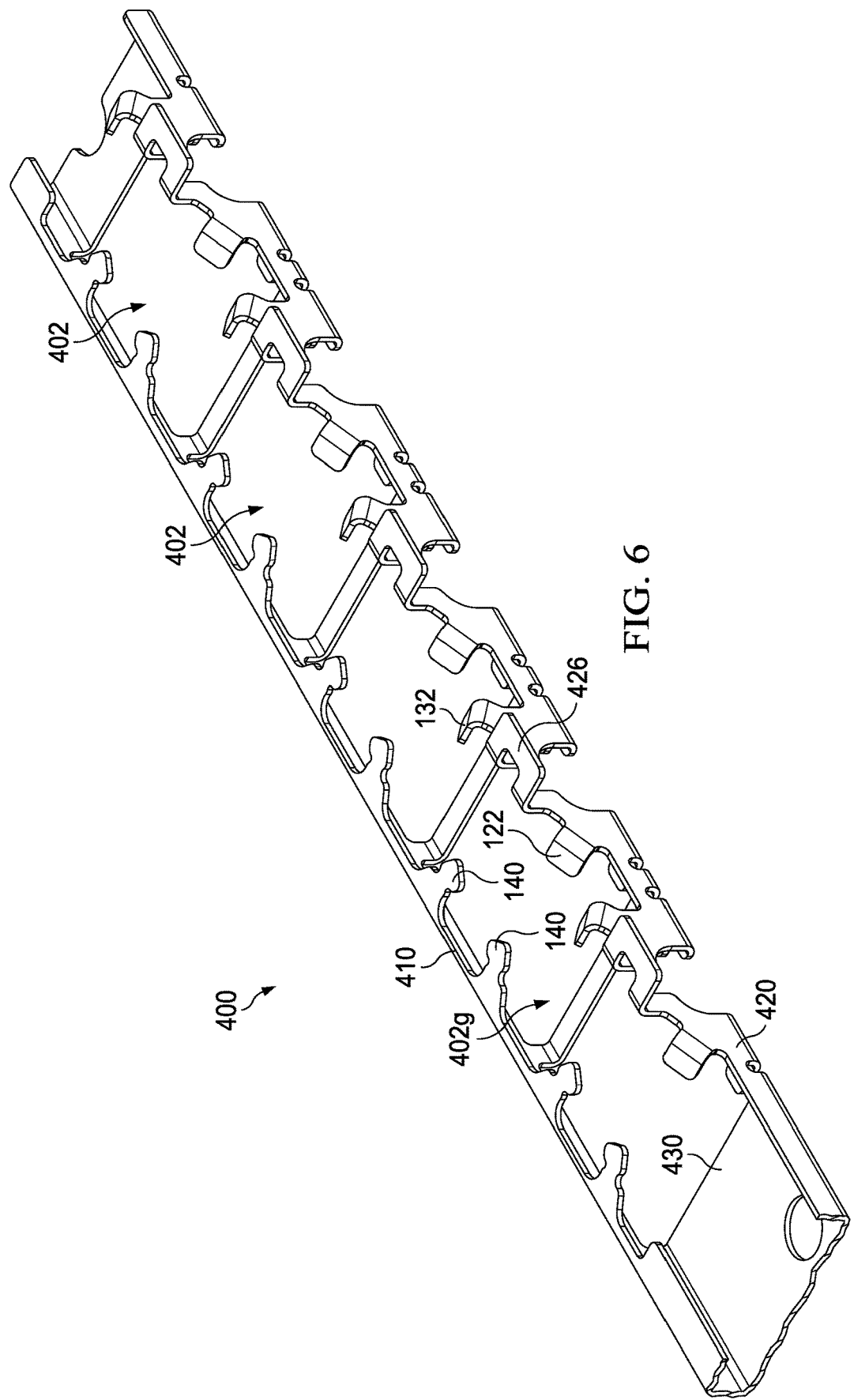

FIG. 5 depicts the leadframe 400 after portions of it have been bent into the 3D shape as shown. Each of the conductive winding receptacles 402 are illustrated. FIG. 6 shows a close-up view of some of the conductive winding receptacles 402. The rear side 410 has been bent up 90 degrees and then the protruding portions 412 and 414 have been bent an additional 90 degrees to thereby form the shelves 140. The front side 420 also has been 90 degrees to begin to form the conductive winding supports 120 and 130, and protruding portions 422 and 424 have been bent an additional 90 degrees to thereby be coplanar with, or parallel to, shelves 140. The connecting portion 426 between protruding portions 422 and 424 is still present.

Figure 7:
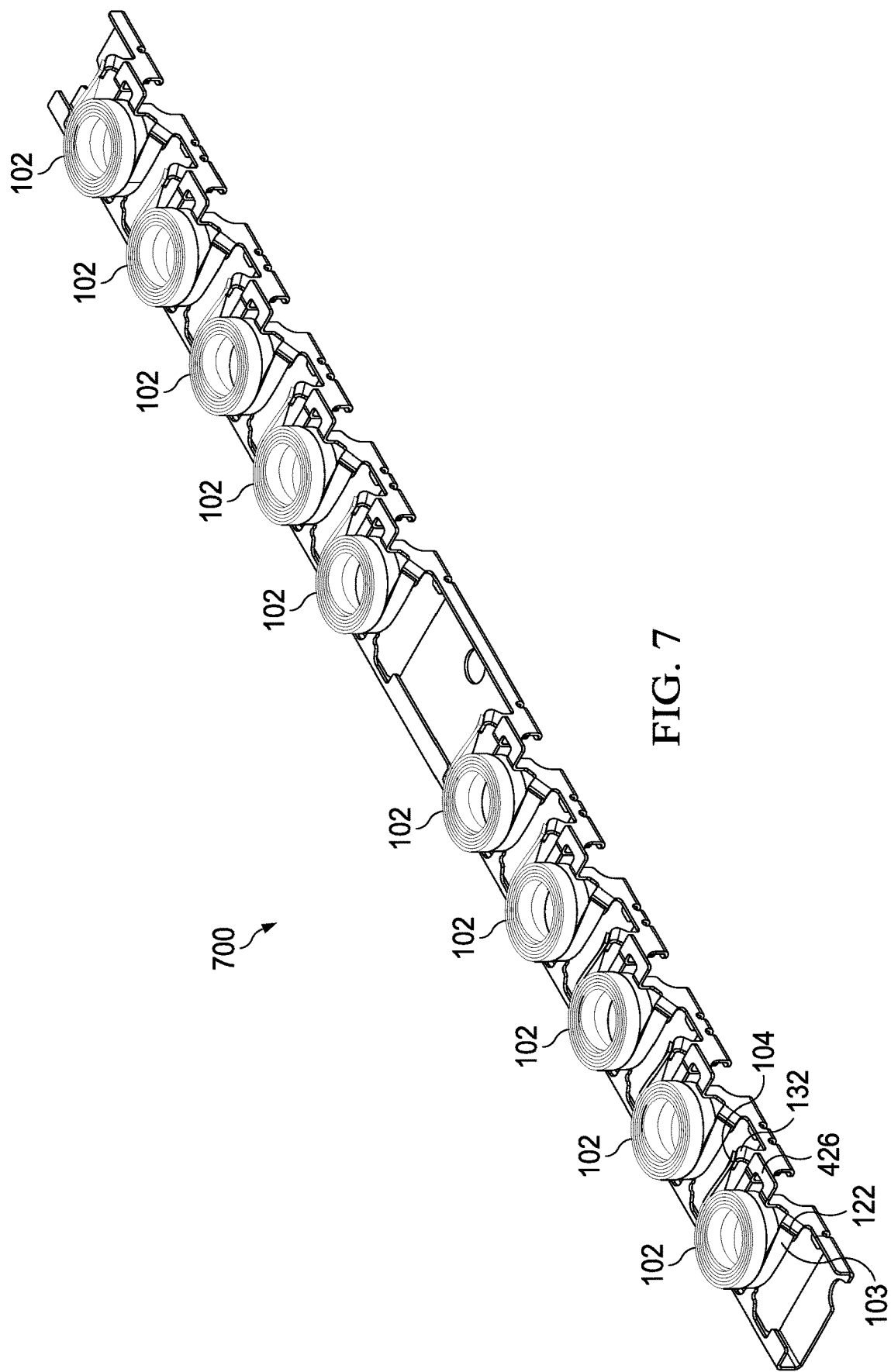
FIGS. 7 and 8 illustrate an example of a subassembly strip comprising conductive windings attached to the leadframe.
Figure 8:
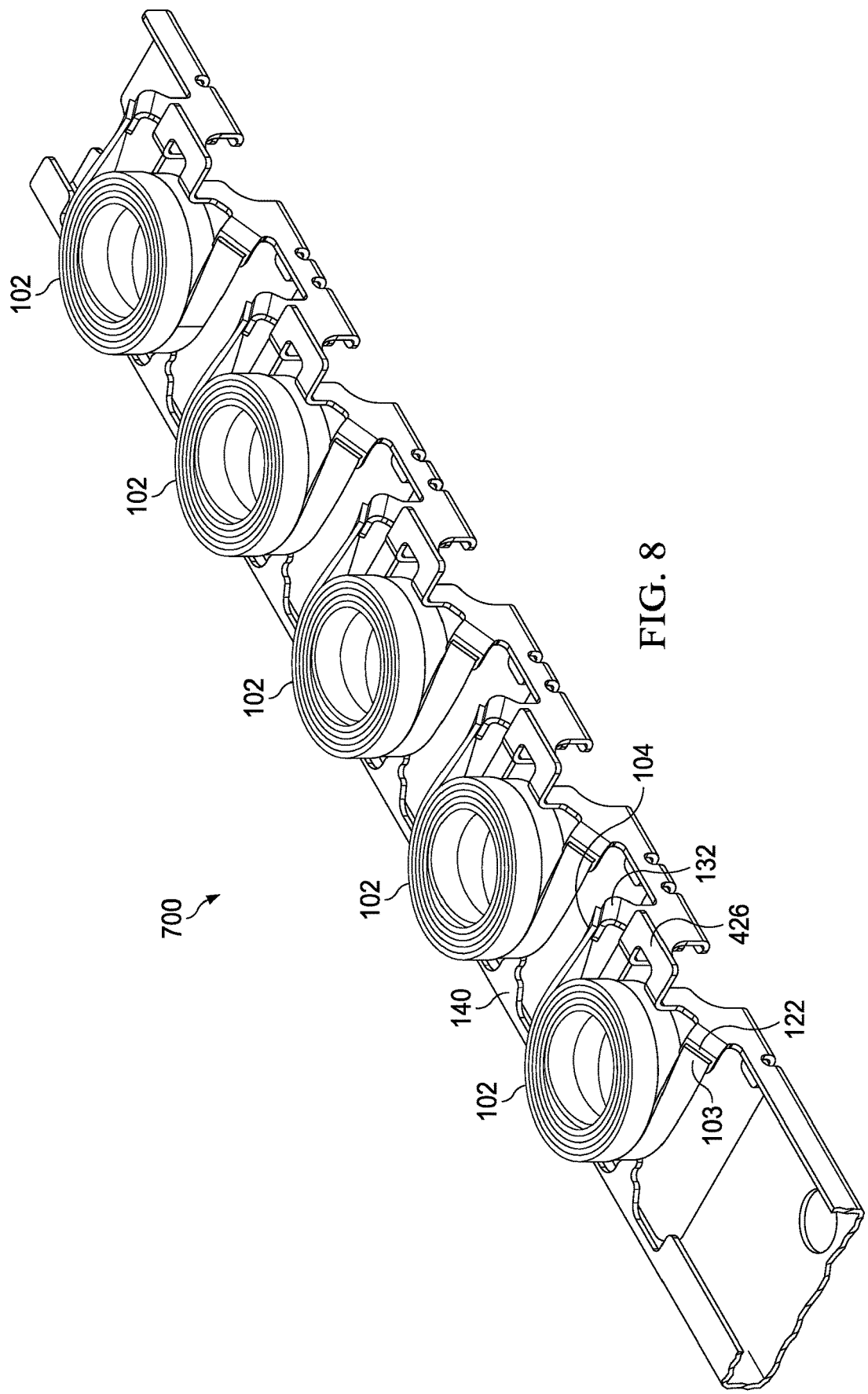

FIG. 7 illustrates a subassembly strip 700 comprising the leadframe 400 bent from its planar configuration as depicted in FIGS. 5 and 6 to the 3D configuration. A separate conductive winding 102 has been placed on or in each conductive winding receptacle 402. FIG. 8 shows a close-up view of the subassembly strip 700. The rear bottom surface of each conductive winding 102 sits on top of the shelves 140, and the winding ends 103 and 104 are attached (e.g., laser welded) to the support surfaces 122 and 132 of the conductive winding supports 120 and 130.

Figure 9:
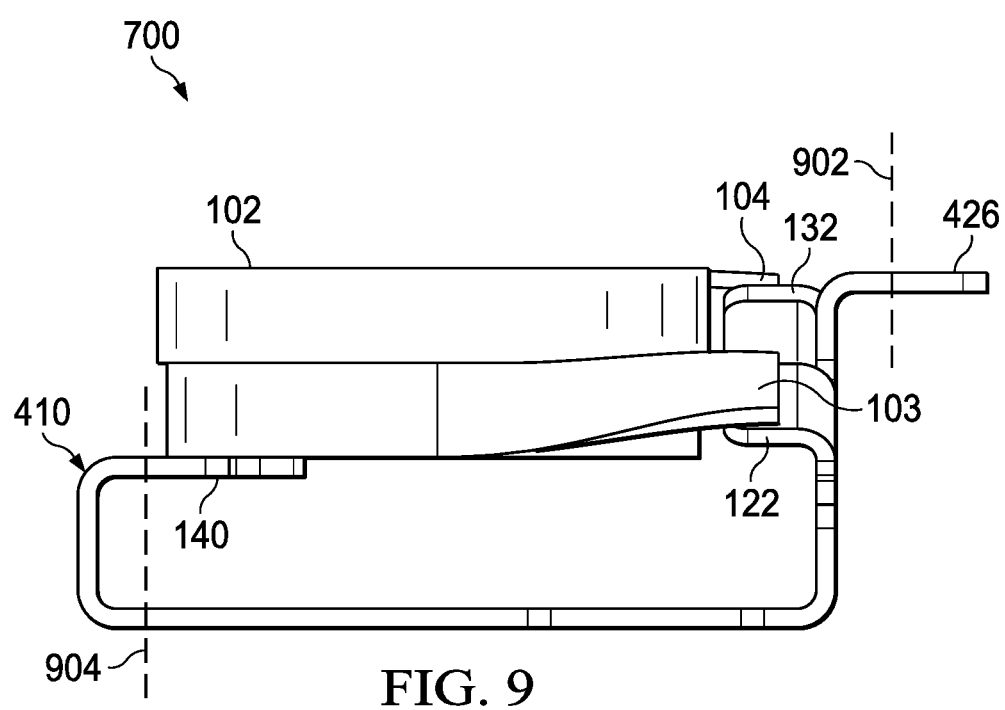
FIG. 9 shows a side of the example subassembly strip.

FIG. 9 shows a side view of the subassembly strip 700. A conductive winding 102 is shown resting on the shelves 140. The winding end 103 is shown attached to support surface 122. The connecting portion 426 protrudes away from the conductive winding 102 as shown. Dashed line 902 indicates approximately where the connecting portion 426 will subsequently be cut during a singulation operation to create the separate horizontal lips 124 and 134. Dashed line 904 indicates approximately where the rear side 410 will be subsequently be cut.

Figure 10:
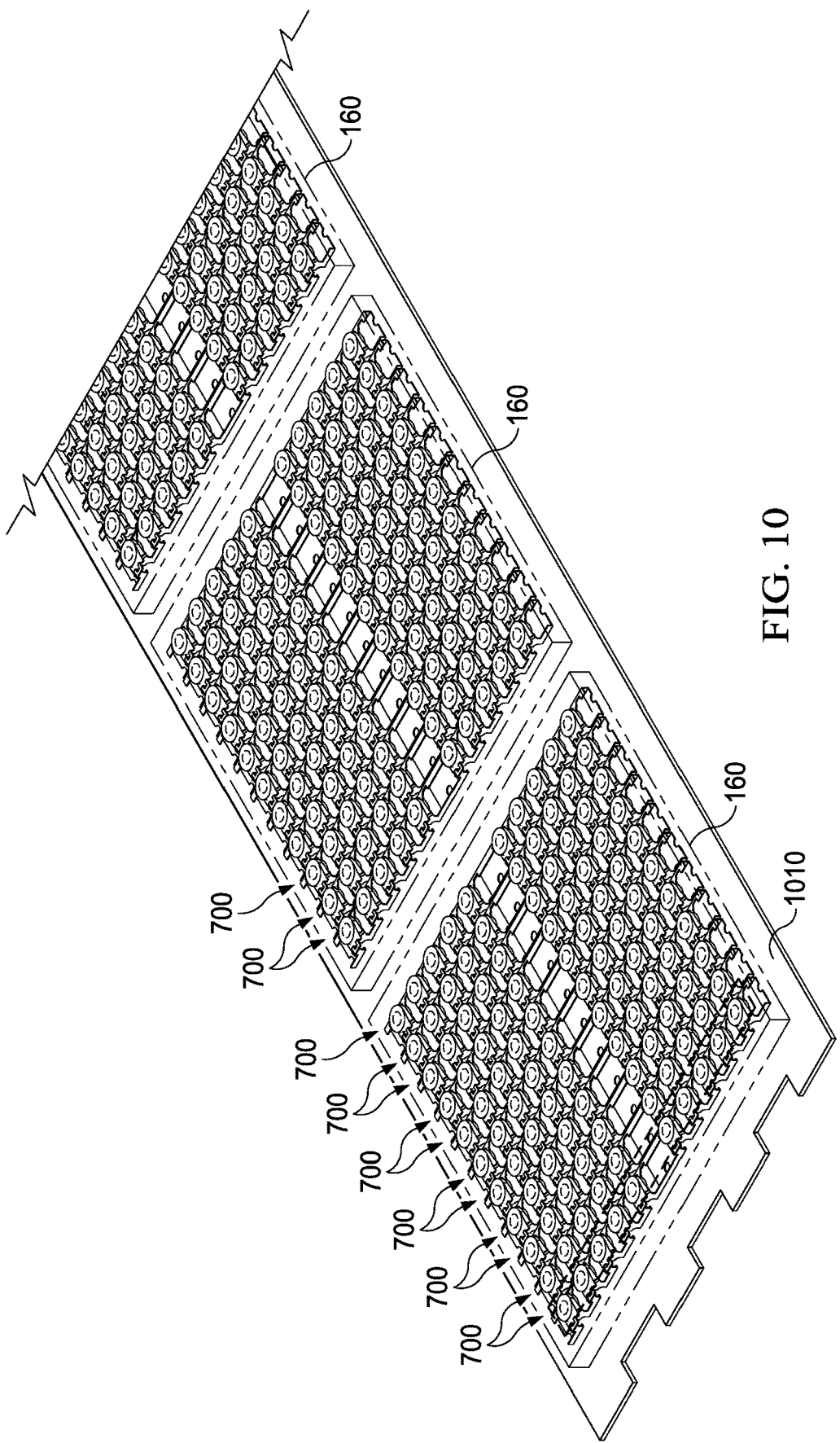
FIG. 10 shows an example of multiple subassembly strips attached to a module substrate with mold compound.
Figure 11:
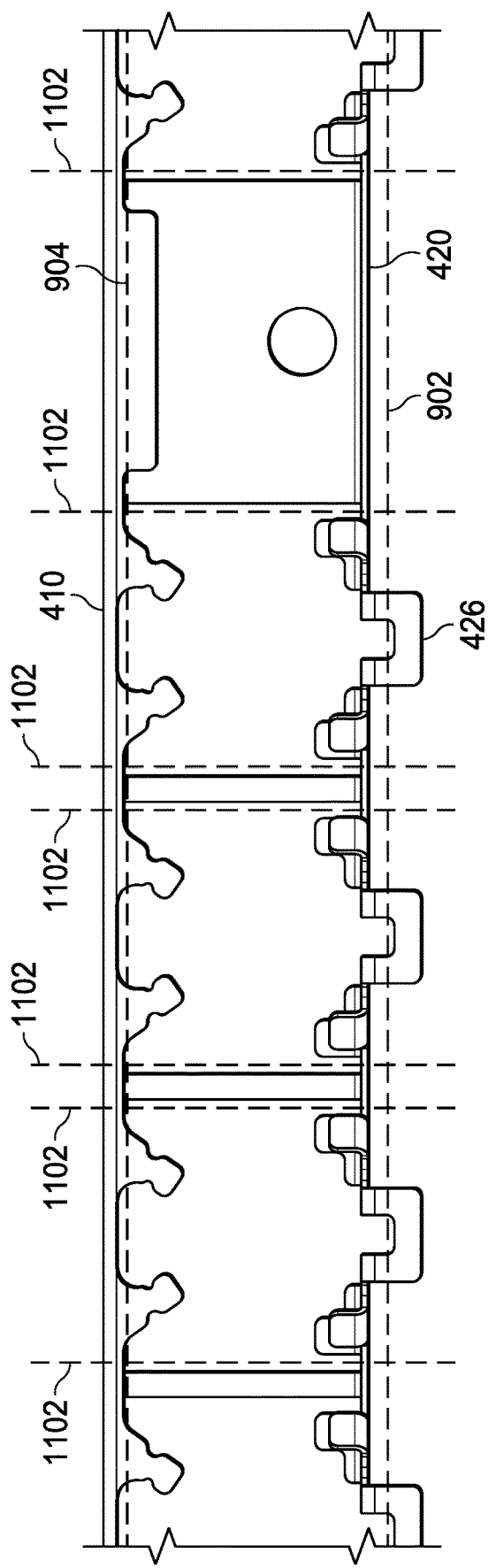
FIG. 11 shows a top-down view of the leadframe indicating where the singulation cuts are to be made.

FIG. 10 illustrates a module substrate 1010. The module substrate 1010 includes multiple circuit assemblies. Each circuit assembly includes the components of, for example, a voltage regulator other than the inductor (i.e., the conductive winding 102). FIG. 10 further illustrates multiple subassembly strips 700 placed on top of the module substrate 1010 such that each conductive winding 102 sits generally above the respective circuit assembly on the module substrate 1010. In this particular example, 44 separate assemblies 700 (each subassembly strip 700 comprising 10 conductive windings in a strip) are attached to the module substrate 1010. The module substrate 1010 may include registration members that mate with the alignment notches 440 and 442 and the alignment hole 432 of the leadframe 400 of each subassembly strip 700. Mold compound 160 is applied to the combination of the FIG. 11 shows a top-down view of the leadframe 400 and without the module substrate 1010 and the conductive windings 102. Dashed lines 902 and 904 are shown along the front side 420 and rear side 410, respectively. The combination of the module substrate 1010, subassembly strips 700, and mold compound 160 is singulated along dashed line 902. Further, orthogonal to the cuts made along dashed lines 902 and 904, cuts are also made along lines 1102 to separate the individual combinations of conductive winding and circuit assembly thereby resulting in the devices 100 such as that shown in FIG. 1.

Figure 12:
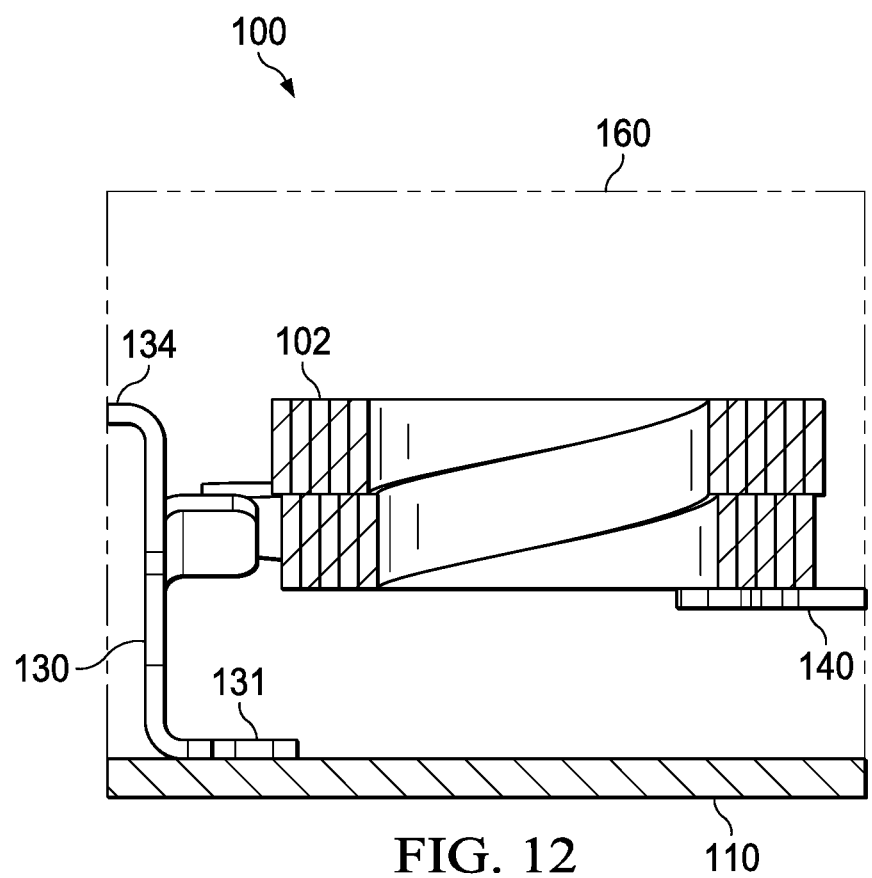
FIG. 12 shows a side view of the completed device.

FIG. 12 shows a side view of a device 100. The conductive winding 102 is attached to conductive winding supports 120 and 130 (only conductive winding support 130 is shown in this side view). The conductive winding support 130 is attached to the circuit assembly 110. The shelves 140 are shown at the opposite end of the conductive winding 102. The shelves were originally part of the leadframe 400, and provide mechanical stability before application of the mold compound. Following singulation, the shelves remain adjacent the bottom surface of the conductive winding 102.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:
1. A device, comprising:
a circuit assembly;
a first conductive winding support having a first end attached to the circuit assembly and having a first winding support surface a first distance from the circuit assembly;
a second conductive winding support having a second end attached to the circuit assembly and having a second winding support surface a second distance from the circuit assembly, the second distance being different than the first distance; and
a conductive winding having first and second winding ends, the first winding end attached to the first winding support surface, and the second winding end attached to the second winding support surface, wherein the first winding support surface defines a first plane, and the circuit assembly defines a second plane, and the first plane is at an angle with respect to the second plane, wherein the angle is less than 90 degrees, wherein the first conductive winding support includes a vertical post including a lip portion projecting horizontally from the vertical post, an end surface of the lip portion is exposed from a surface of the device, wherein the lip portion is adjacent to a top surface of the device than a bottom surface of the device, and wherein the lip portion is above the first winding support surface from a side view of the device.

2. The device of claim 1, wherein the first and second winding ends are laser-welded to the respective first and second winding support surfaces.

3. The device of claim 1, wherein the conductive winding is positioned over the circuit assembly, and wherein the device comprises mold compound covering portions of the winding and the circuit assembly.

4. The device of claim 3, wherein the conductive winding is spaced apart from the circuit assembly, and mold compound is between the conductive winding and the circuit assembly.

5. The device of claim 3, wherein the mold compound is a magnetic mold compound.

6. The device of claim 3, wherein the end surface of the lip portion is exposed from a surface of the magnetic mold compound.

7. The device of claim 1, further comprising a shelf abutting the conductive winding on a side of the conductive winding opposite the first and second winding ends.

8. The device of claim 7, wherein the shelf and the first and second conductive winding supports are made of a same material.

9. The device of claim 1, wherein the conductive winding is circular at least from one view of the device.

10. The device of claim 1, wherein the circuit assembly includes a switching power supply assembly.

11. The device of claim 1, wherein the device is a voltage regulator.

12. A device, comprising:
   a switching power supply assembly;
   a first conductive winding support having a first end attached to the switching power supply assembly and having a first winding support surface a first distance from the switching power supply assembly;
   a second conductive winding support having a second end attached to the switching power supply assembly and having a second winding support surface a second distance from the switching power supply assembly, the second distance being different than the first distance; and
   a winding having first and second winding ends, the first winding end is attached to the first winding support surface, and the second winding end is attached to the second winding support surface, wherein each of the first conductive winding support and the second conductive winding support includes a vertical post including a lip portion projecting horizontally from the vertical post, wherein an end surface of the lip portion is exposed from a surface of the device, wherein the lip portion of the first conductive winding support is above the first winding support surface and the second winding support surface from a side view of the device.

13. The device of claim 12, wherein the first winding surface defines a first plane, and the second winding surface defines a second plane, and the first plane is at an angle with respect to the second plane that is less than 180 degrees.

14. The device of claim 13, wherein the winding is positioned over the switching power supply assembly, and wherein the device comprises mold compound encapsulating the winding and the switching power supply assembly.

15. The device of claim 12, wherein the winding is spaced apart from the switching power supply assembly, and mold compound is between the winding and the switching power supply assembly.

16. The device of claim 12, further comprising a first and second shelves abutting the winding on a side of the winding opposite the first and second winding ends.

17. The device of claim 12 further comprising a magnetic mold compound covering portions of the switching power supply assembly, the first conductive winding support, the first conductive winding support, and the winding.

18. The device of claim 17, wherein the end surface of the lip portion is exposed from a surface of the magnetic mold compound.

* * * * *